(12) United States Patent
Kuznetsov

(10) Patent No.: US 8,700,512 B1
(45) Date of Patent: Apr. 15, 2014

(54) FINANCIAL PLANNING BASED ON CONTEXTUAL DATA

(71) Applicant: Rawllin International Inc., Tortola (VG)

(72) Inventor: Vsevolod Kuznetsov, Sankt-Petersburg (RU)

(73) Assignee: Rawllin International Inc., Tortola (VG)

( * ) Notice: Subject to any disclaimer, the term of this patent is extended or adjusted under 35 U.S.C. 154(b) by 0 days.

(21) Appl. No.: 13/651,568

(22) Filed: Oct. 15, 2012

(51) Int. Cl.
*G06Q 40/00* (2012.01)

(52) U.S. Cl.
USPC .......................................................... 705/35

(58) Field of Classification Search
USPC .......................................................... 705/35
See application file for complete search history.

(56) References Cited

U.S. PATENT DOCUMENTS

| | | | |
|---|---|---|---|
| 7,440,919 B2 * | 10/2008 | Odegaard et al. | 705/37 |
| 7,689,682 B1 * | 3/2010 | Eldering et al. | 709/223 |
| 7,809,625 B1 * | 10/2010 | Thurmond et al. | 705/36 R |
| 2002/0091608 A1 * | 7/2002 | Odegaard et al. | 705/36 |

* cited by examiner

*Primary Examiner* — Lindsay M. Maguire
(74) *Attorney, Agent, or Firm* — Amin, Turocy & Watson, LLP

(57) ABSTRACT

A financial planning system uses contextual data about a user to help create and modify a financial plan to achieve a financial goal. Financial goals can include money saving goals, investment goals, loan payment goals, and goals to purchase or rent goods, property and/or services. In some embodiments, the financial planning system can create a collaborative financial plan to create a financial plan for a group of people to achieve a shared financial goal. Contextual data, such as banking information, social network activity, past activity, preferences, etc., can be used to shape the financial plan to make it more effective and efficient. Banking accounts, social network accounts, loyalty program accounts, and others can be linked to the financial planning system to enable the financial planning system in gathering contextual background information.

20 Claims, 10 Drawing Sheets

FINANCIAL PLANNING BASED ON CONTEXTUAL DATA

TECHNICAL FIELD

The subject disclosure relates generally to electronic commerce, and more particularly to using contextual data about users to create financial plans to achieve financial goals.

BACKGROUND

Developing a plan to achieve a financial goal and carrying out the plan can be challenging for a large number of consumers. Consumers may face distractions or setbacks that prevent them from achieving a goal, or circumstances that existed when a plan was developed may change over time. Moreover, consumers may not have sufficient knowledge to develop an efficient plan for more complicated goals. A common option that consumers may choose is using a line of credit, such as a credit card, and paying down the line of credit over time, but this could be costly in terms of interest and the negative impact to their credit score.

There may be other, more efficient ways to achieve their goals, but without knowledge of these better ways, the consumers will not be able to choose them. Likewise, financial planners and advisors who do have knowledge of advanced techniques, may not be able to select the best option due to a lack of contextual information about the consumer's background.

Additional difficulties arise when consumers attempt to coordinate a plan for a financial goal that involves multiple parties. Integrating different personalities, desires, and financial knowledge into a single cohesive plan, and ensuring that each of the parties understand and complete their respective duties with regard to the plan can be difficult. Also, practical considerations such as how or where to maintain funds of respective parties can present additional problems The above-described description is merely intended to provide a contextual overview of common financial planning systems, and is not intended to be exhaustive.

SUMMARY

Various non-limiting embodiments provide for collecting and analyzing contextual background information for a consumer or a set of consumers to facilitate creating a financial plan to achieve a goal. In an example embodiment, a system comprises a memory storing computer-executable components and a processor communicatively coupled to the memory that executes or facilitates execution of one or more of the computer-executable components. The executable components can include a search component that collects contextual data related to a user identity. An analysis component can be included to organize the contextual data into a user profile and determine a relevancy of the contextual data to a financial goal associated with the user identity. Also included is a planning component that generates a financial plan to achieve the financial goal based at least in part on relevant contextual data in the user profile.

In another example embodiment, a method comprises gathering, by a system including at least one processor, data that provides contextual background for a user identity. The method also includes identifying portions of the contextual background that are determined to be commercially relevant to a financial goal and creating a financial plan to achieve the financial goal based at least in part on the portions of the contextual background that are determined to be commercially relevant.

In another example embodiment, a tangible computer readable storage device has computer-executable instructions that, in response to execution, cause a system including a processor to perform operations comprising collecting contextual data related to a user identity and generating a user profile based on the contextual data. The operations further comprise identifying a portion of the user profile that is relevant to a financial goal. The operations also include creating a financial plan to achieve the financial goal based on portion of the user profile identified to be relevant to the financial goal.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
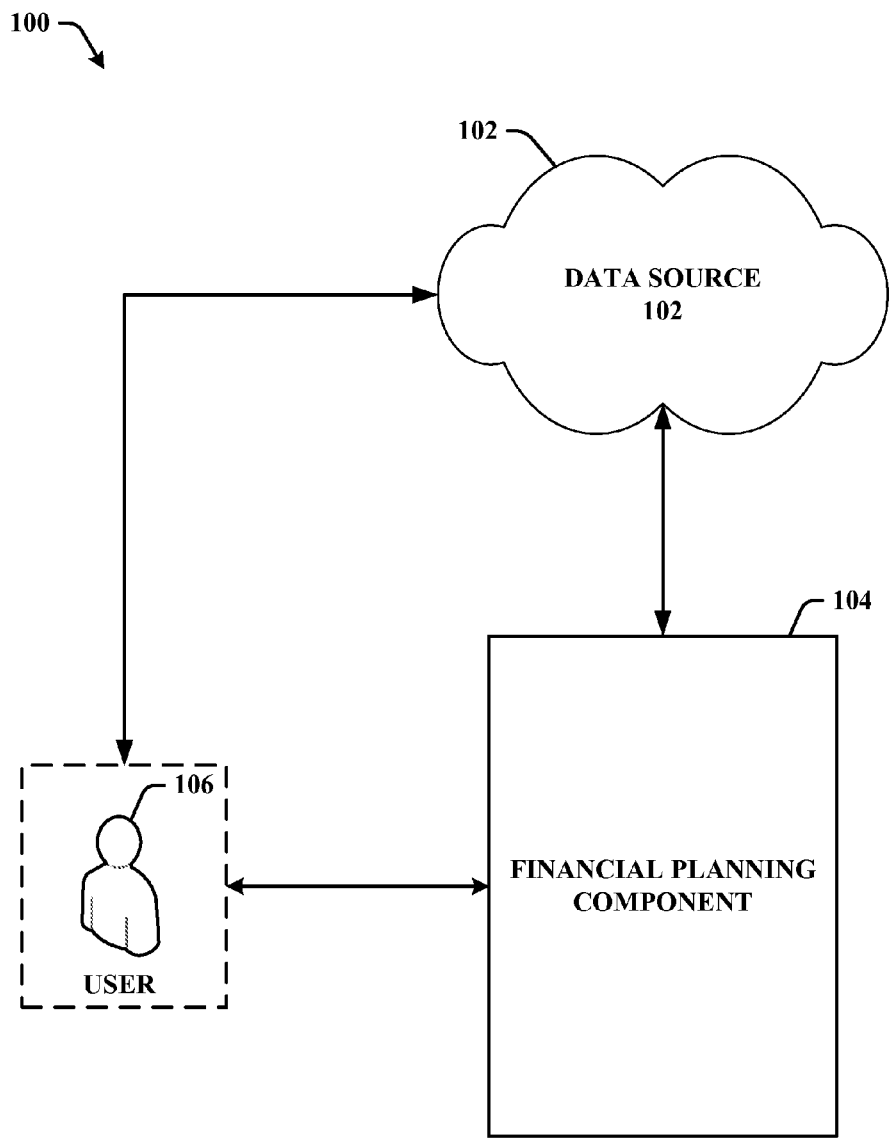
FIG. 1 is a block diagram illustrating an example, non-limiting embodiment of a financial planning system that uses contextual data in accordance with various aspects described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, can be arranged, substituted, combined, separated, and designed in a wide variety of different configurations, all of which are explicitly contemplated herein.

In various non-limiting embodiments, a financial planning system is provided that uses contextual background data of a user to help create and modify a financial plan to achieve a financial goal. Financial goals can include money saving goals, investment goals, loan payment goals, and goals to purchase or rent goods, property and/or services. In some embodiments, the financial planning system can create a collaborative financial plan to create a financial plan for a group of people to achieve a shared financial goal. Contextual data, such as banking information, social network activity, past activity, preferences, etc., can be used to shape the financial plan to make it more effective and efficient. Banking accounts, social network accounts, loyalty program accounts, and others can be linked to the financial planning system to enable the financial planning system in gathering contextual background information.

In various non-limiting embodiments, the financial planning system can dynamically update or suggest changes to a goal based on changes and/or additions to the contextual background data (life events, changing preferences, recent transaction history, and etc.). In an embodiment, the financial planning system determines the best payment plan based on information related to the financial status of the participating users. The financial planning system can also infer the preferred plan based on past usage and/or other information about the participating users.

Referring now to FIG. 1, a block diagram illustrating an example, non-limiting embodiment of a financial planning system 100 that uses contextual data is shown. Generally, system 100 can include a memory that stores computer-executable component and a processor that executes the computer-executable components stored in memory, examples of which can be found with reference to FIG. 9. System 100 includes a financial planning component 104. The financial planning component 104 creates a financial plan to achieve a financial goal associated with user 106.

Financial planning component 104 can create and tailor the financial plan for user 106 based on contextual background information that financial planning component 104 gathers from data source(s) 102. Data source 102 can include one or more sources of publicly and privately available information that provide contextual background for user 106. The contextual background can be used by financial planning component 104 to make an effective and efficient financial plan tailored to user 106. The plan can include, but is not limited to, financial plans (e.g., budget, etc.) for the user 106, contributions, dates of contributions, savings targets, and etc. For instance, the financial planning component 104 can determine that user 106 will contribute X dollars on a set of dates corresponding to a pay cycle of the user 106, where X is a real number greater than zero.

Contextual background, such as current savings, liabilities, employment information, transaction history, salary or wage history, marital status, and other information can be used to modify the financial plan. For example, without contextual background, a financial plan to save $10,000 may suggest contributing $1000 per month for 10 months. Using relevant contextual background information however, the financial planning component 104 may determine that contributing a lower monthly amount and then contributing an end of year bonus that the user 106 receives would be a more efficient plan for achieving the goal. Financial planning component 104 can search for contextual background information, determine which portions are relevant to the financial goal, and then create the financial plan based at least in part on the relevant contextual background information.

Figure 2:
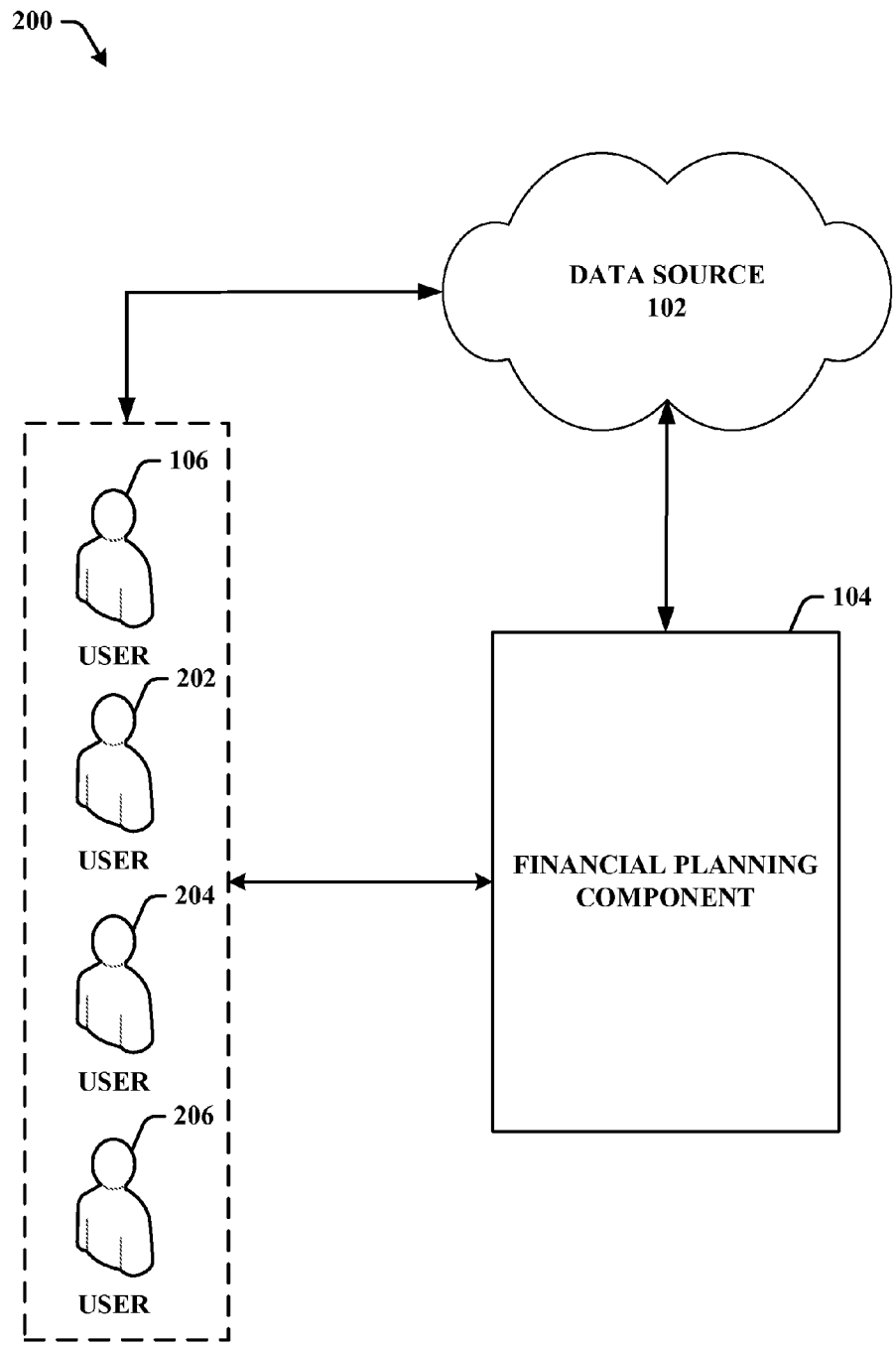
FIG. 2 is a block diagram illustrating an example, non-limiting embodiment of a collaborative financial planning system that uses contextual data in accordance with various aspects described herein.

Turning now to FIG. 2, illustrated is a block diagram of a collaborative financial planning system 200 that uses contextual data. Collaborative financial planning system 200 includes a financial planning component 104 that uses contextual background information associated with users 106, 202, 204, and 206 to create a financial plan to achieve a financial goal shared between users 106, 202, 204, and 206.

The embodiment of the financial planning system depicted in FIG. 2 is similar to the embodiment described above with regard to FIG. 1 except with regard to the number of users. In many of the embodiments described in this disclosure, the financial planning system can be operable for one or more users, and should not be limited by the number of users shown in the figures.

Financial planning component 104 can receive or determine a financial goal associated with user 106, 202, 204, and 206. The financial goal can be a collaborative saving or investment goal or can be a goal to jointly purchase or rent some good, service or property. Financial planning component 104 can collect contextual background data on users 106, 202, 204, and 206 from data source 102 and generate a collaborative plan to achieve the joint financial goal based on the relevant contextual background data.

The contextual background information gathered from financial institutions, social networks, Internet activity, educational and career history and etc., can be used to create user profiles for each of the users 106, 202, 204, and 206. The collaborative plan can set contribution amounts and times based on the user profile. For example, the financial planning component 104 can set contribution times to match dates that each of the users 106, 202, 204, and 206 receive paychecks. The relative contribution amounts can also match the relative income levels or net worth of the users 106, 202, 204, and 206 to make the collaborative plan more equitable. In some embodiments, the financial planning component 104 can also determine, based on the contextual background information, whether one or more of the users 106, 202, 204, and 206 will realize an increased benefit from the financial goal. If so, financial planning component 104 can correspondingly increase the contribution amounts, or contribution frequency of those users.

Figure 3:
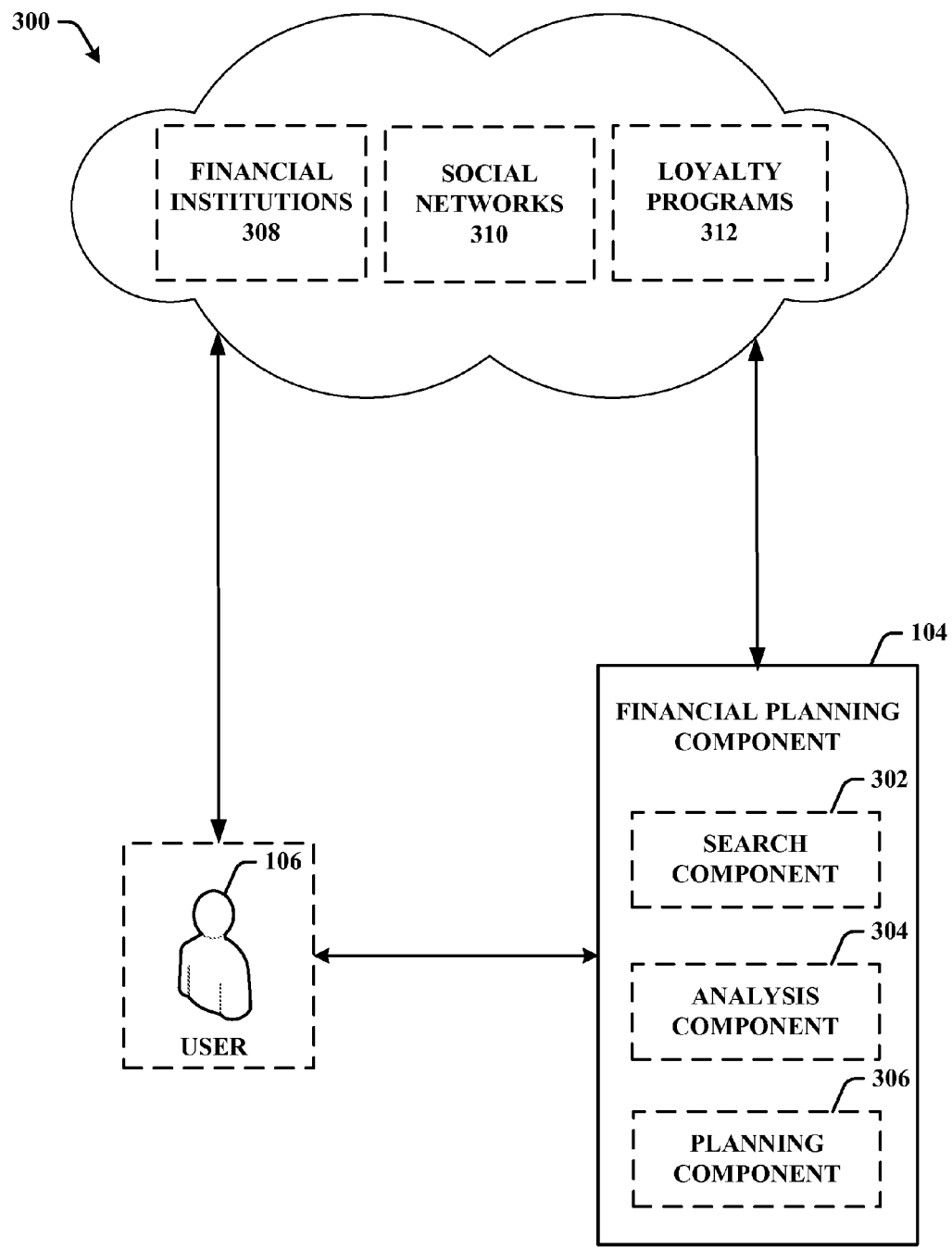
FIG. 3 is a block diagram illustrating an example, non-limiting embodiment of a financial planning system that uses contextual data in accordance with various aspects described herein.

Referring now to FIG. 3, a block diagram illustrating an example, non-limiting embodiment of a financial planning system 300 that uses contextual data is shown. System 300 includes a financial planning component 104 that creates a financial plan for user 106 based on contextual background information received from financial institutions 308, social networks 310 and loyalty programs 312. Financial planning component 104 includes a search component 302, an analysis component 304 and a planning component 306.

Search component 302 can collect contextual data related to a user 106 or user identity. The search component 302 can obtain, locate, or otherwise acquire data relating to user 106 using identifiers associated with the user 106 that are obtained by the search component 302. For example, the identifiers can include but are not limited to name of the user 106, date of birth, email address, home address, phone number, and so forth. The search component 302 can acquire contextual data relating to the user 106 by searching a set of data sources that include, but are not limited to financial institutions 308, social networks 310, and loyalty programs 312.

The data sources that can be searched by search component 302 include virtually any open source or publicly available sources of information, including but not limited to websites, search engine results, social networking websites, online resume databases, job boards, government records, online groups, payment processing services, online subscriptions, and so forth. In addition, the data sources can include private databases, such as credit reports, loan applications, and so forth. The search component 302 can connect to these additional data sources as well as financial institutions 308, social networks 310 and loyalty programs 312 via a communication link (e.g., comm link, network connection, etc.). For example, the search component 302 can obtain a set of contextual data relating to user 106 by querying one or more internet search engines using the identifiers.

Search component 302 is not limited to receiving just account balance information from bank accounts, credit accounts, investment accounts and other accounts associated with financial institutions 308. Instead, search component 302 can also received detailed transaction histories, historical trend information, information about linked accounts, and so forth from financial institutions 308.

Search component 302 can also gather contextual information from social networks 310. Activity on social networks such as "check-ins", "likes" and so forth can be collected to form a background about preferences associated with user 106. Comments and user profiles on social networks 310 can also be searched and mined for contextual background information. Transaction histories and details about accounts with loyalty programs 312 can also be collected as contextual background information.

Analysis component 304 can organize the contextual data gathered by search component 302 into a user profile associated with user 106. Analysis component 304 can also determine which portions of the contextual data and user profile are relevant to the financial goal held by user 106. In some embodiments the user profile can be arranged chronologically, and in others it can be arranged relationally. A relationally organized user profile can apply tags to bits of the contextual data wherein the tags indicate a shared relationship. For instance, contextual data providing information about purchases made by the user 106 can share a tag or identifier. Subsets of that purchase information—such as data about luxury item purchases, or expenses for utilities can share a sub-tag indicating another layer of relationships.

Analysis component 304 can determine whether the contextual data is relevant to the financial goal based on an analysis of the contextual data tags. For instance, if the financial goal is related to a purchase of a luxury good, contextual data related to other purchases of a luxury good, among other items, can be considered relevant. If the financial goal is related to an investment goal, contextual data providing information about finances, cash flow, risk level, and so forth can be considered relevant. Contextual data providing user preferences for pets, or ice cream flavors gleaned from social network 310 can be contextual data that may be considered irrelevant.

The analysis component 304 can also determine that one or more subsets of contextual data are relevant based on a correlation with a set of predetermined characteristics, or satisfaction of a set of predetermined criteria. For example, the set of predetermined criterion can include, but are not limited to, a relation of a search result to the user 106, a trustworthiness of the source from which the search result was obtained, or a classification of the result. For example, if the search component 302 returns a social networking website profile for a user having the same name as the user 106, but the profile information (e.g., data birth, email address, etc.) is different from the identifiers known for the user 106, then the analysis component 304 can determine that the social networking website profile, or information included in the social networking website profile, should not be considered relevant, or even included in the user profile at all.

Planning component 306 can create a financial plan to achieve the financial goal based at least in part on relevant contextual data in the user profile. In some embodiments, planning component 306 can generate a set of plans and present the plans to users 106 who can then choose the financial plan s/he would like to pursue. The financial plan can include contribution amounts, contribution times, and so on to achieve the financial goal. For instance, if a savings goal is to save $10,000, planning component 306 can create a plan where user 106 contributes $1,000 every month for 10 months. If the relevant contextual data shows that user 106 cannot afford to save $1,000 every month, planning component 306 can adjust the financial plan to match the capabilities of user 106.

In an embodiment, planning component 306 can also create a collaborative plan for a set of users (e.g., 106, 202, 204, and 206) to achieve a shared financial goal. For example, if one or more users has a more secure financial status (e.g., more money, better credit, etc.), or has indicated a willingness to contribute increased amounts, planning component 306 can take this information into account, and the collaborative plan can have that user(s) contribute an increased amount.

In one example embodiment, planning component 306 can also create financial plans to optimize expenses and/or streamline a budget. Planning component 306 can examine transaction histories associated with financial institutions to learn about the expenses that user 106 incurs on a regular basis. Planning component 306 can identify wasteful areas of spending and create a financial plan that optimizes the expenses. For instance, planning component 306 can analyze expenses to determine that user 106 infrequently travels. Planning component 306 can then search through tags of contextual data showing possible wasteful spending. Payments for phone plans that include roaming expenses, and payments for travel insurance can be examples of spending that planning component 306 identifies and cuts from the financial plan. Planning component 306 can also make suggestions about purchasing alternative goods or services in order to reduce costs.

Figure 4:
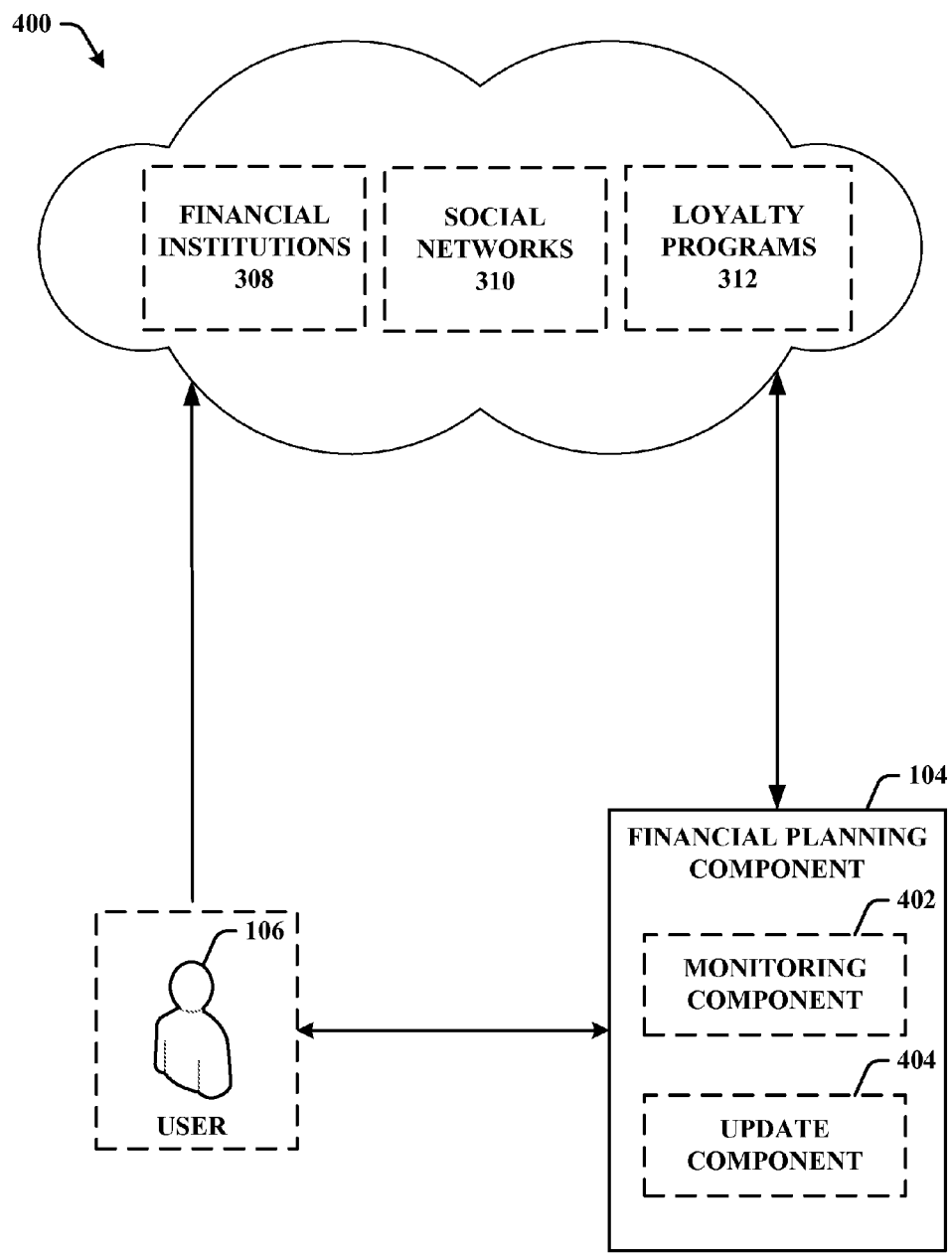
FIG. 4 is a block diagram illustrating an example, non-limiting embodiment of a monitoring and updating system in accordance with various aspects described herein.

Turning now to FIG. 4, a block diagram illustrating an example, non-limiting embodiment of a monitoring and updating system 400 in accordance with various aspects described herein is shown. Included in system 400 is the financial planning component 104 with a monitoring component 402 and an update component 404.

Monitoring component 402 can check for changes and/or additions to the contextual background of user 106. Monitoring component 402 can check for changed data at financial institutions 308, social networks 310 and loyalty programs 312 as well as other sources of contextual background information. In some embodiments, monitoring component 402 can monitor for changes by performing searches with the identifiers used by the search component 302, and comparing the results with the results obtained by the search component 302. Any changes in the contextual data can be analyzed by the analysis component 304 to determine if they are relevant to the financial goal. If the changes are relevant, update component 404 can update the financial plan based on the changes.

In some embodiments, monitoring component 402 can check for changes periodically at predefined intervals. In other embodiments, monitoring component 402 can passively monitor financial institutions 308, social networks 310 and loyalty programs 312 by receiving notices directly from the data sources when changes have been made. Notifications can be push notifications in some embodiments and via RSS feeds in other embodiments.

In some embodiments, monitoring component 402 can monitor balance levels of bank and credit accounts in financial institutions 308. Monitoring component 402 can also monitor credit scores as reported by credit rating agencies associated with user 106. Monitoring component 402 can determine whether user 106 has taken out loans, defaulted on payments or has otherwise suffered a loss of financial security.

In some embodiments, when changes are detected by monitoring component 402, update component 404 can update the financial plan. For example, if more than one user (e.g., 106, 202, 204, and 206) is collaborating on a financial plan, and one or more of the participating users have gone bankrupt, or have otherwise lost financial security, update component 404 can modify the collaborative plan such that the other participating users shoulder an increased burden of the load. In other embodiments the update component 404 may increase the burden of one of the participating users if that user has received a financial windfall.

Figure 5:
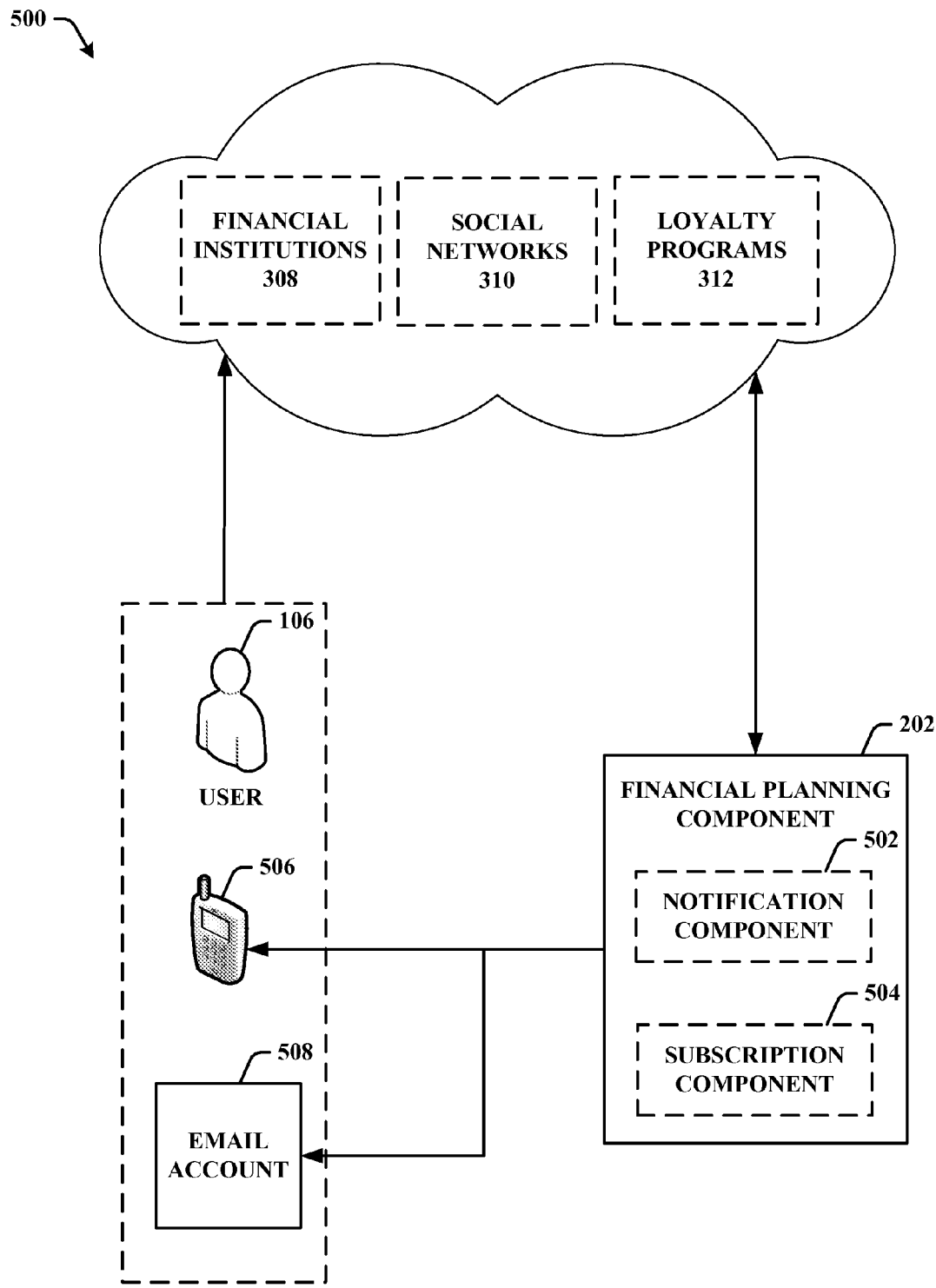
FIG. 5 is a block diagram illustrating an example, non-limiting embodiment of a notification and subscription system in accordance with various aspects described herein.

FIG. 5 illustrates a block diagram of an example, non-limiting embodiment of a notification and subscription system 500. System 500 includes a financial planning component 104 that includes a notification component 502 and a subscription component 504.

Notification component 502 can send notifications to user 106 in response to changes in the contextual data. The changes can be identified for example by monitoring component 402. In some embodiments, notification component 502 can send a notification whenever any change has occurred. In other embodiments, notification component 502 can send a notification whenever any relevant change, or a change that may affect the financial plan has occurred. In still other embodiments, notification component 502 may send changes only when changes that negatively affect the financial plan occur. An example of a negative change would be a change that makes the financial goal more expensive or take longer to achieve.

Notification component 502 can send the notification to user 106 in a variety of manners. In some embodiments, notification component 502 can send the notification as a Short Message Service ("SMS") message to user mobile device 506. In other embodiments, notification component 502 can send the notification to an email account 508 associated with the user 106.

In some embodiments, notification component 502 can send user 106 proposed changes to mobile device 506 or email account 508. The proposed changes could be suggested by update component 404 in response to changed contextual data. Update component 404 can wait to implement the updated financial plan until user 106 has responded to the notification.

Subscription component 504 can receive alerts from any of the sources of contextual data (including, but not limited to financial institutions 308, social networks 310, and loyalty programs 312) in response to contextual background changes for user 106. The alerts received by subscription component 504 can indicate that changes have been made and prompt monitoring component 402 to search for the changes.

In some embodiments, the alerts received by subscription component 504 can also contain the changes made. For instance, the alerts can contain a record of transactions the user 106 participated in with financial institution 308. An alert can contain a digest of transactions, for example, every day or every week, an alert can be sent to subscription component 504 with a record of all transactions or changes in contextual data that occurred during the time period. In other embodiments, the alerts can be sent in real time, once transactions are completed. The alerts can be received by subscription component 504 as email messages or SMS messages.

Figure 6:
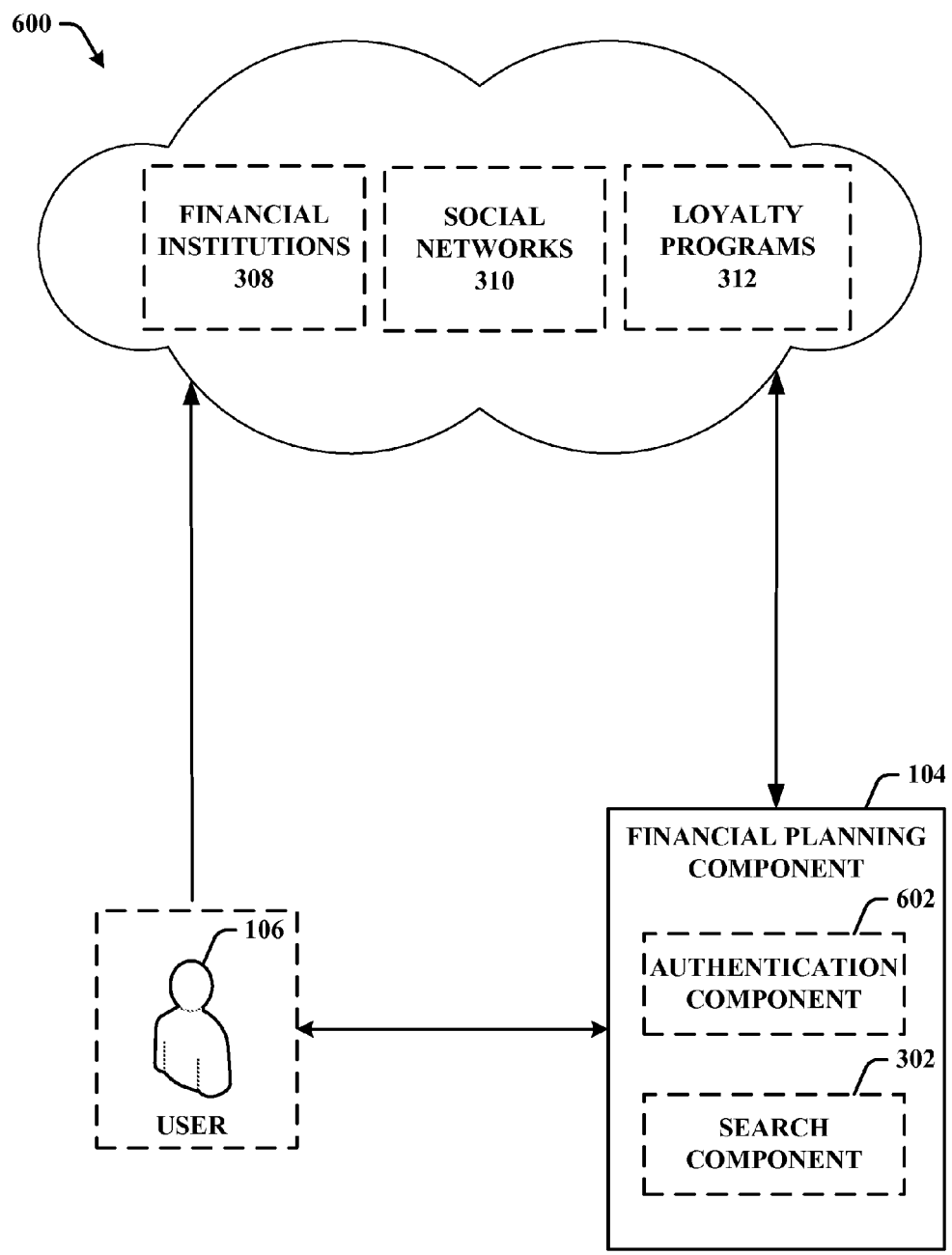
FIG. 6 is a block diagram illustrating an example, non-limiting embodiment of a financial planning system that uses authentication information in accordance with various aspects described herein.

Turning now to FIG. 6, a block diagram illustrating an example, non-limiting embodiment of a financial planning system that uses authentication information is shown. System 600 includes a financial planning component 104 that includes authentication component 602 as well as the search component 302. Authentication component 602 obtains login and other information for authentication purposes from user 106, and search component accesses private information at financial institutions 308, social network 310, and loyalty programs 312 using the login information received from user 106.

The login information can be received by authentication component 602 can be received as explicit user inputs (e.g., configuration selections, question/answer) such as from mouse selections, keyboard selections, speech, and so forth. For instance, the user 106 can provide a first subset of the goal data via selections included in a user interface (e.g., generated using the authentication component 602).

Once the login information is received by authentication component 602, and financial planning component 104 accesses user accounts at financial institutions 308, social networks 310, and loyalty programs 312 associated with the user 106, search component 302 can search the user accounts for transaction records, logs of past activities, and other private information that is not publicly accessible for additional contextual background information.

Figure 7:
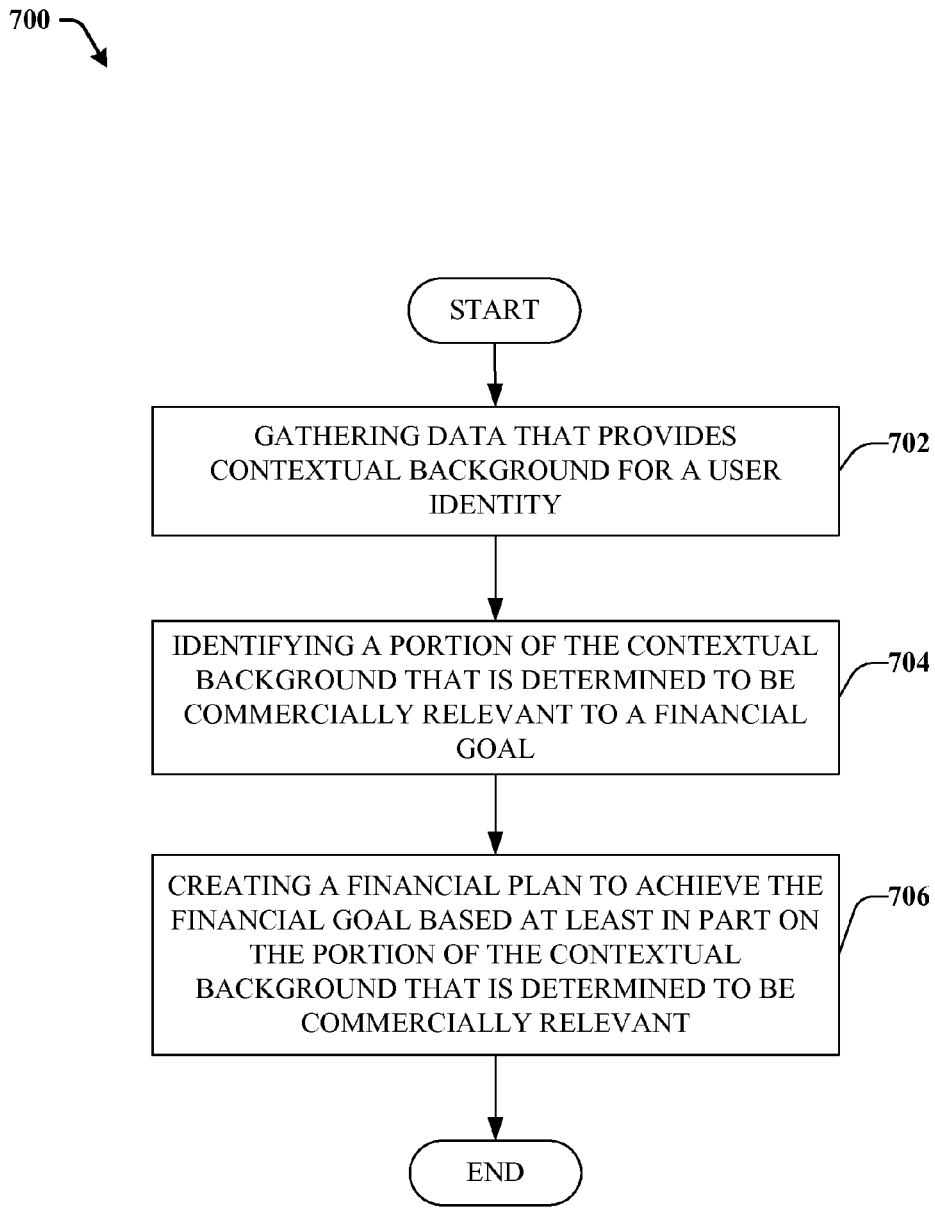
FIG. 7 illustrates a flow diagram of an example, non-limiting embodiment of a method for financial planning using contextual data described herein.
Figure 8:
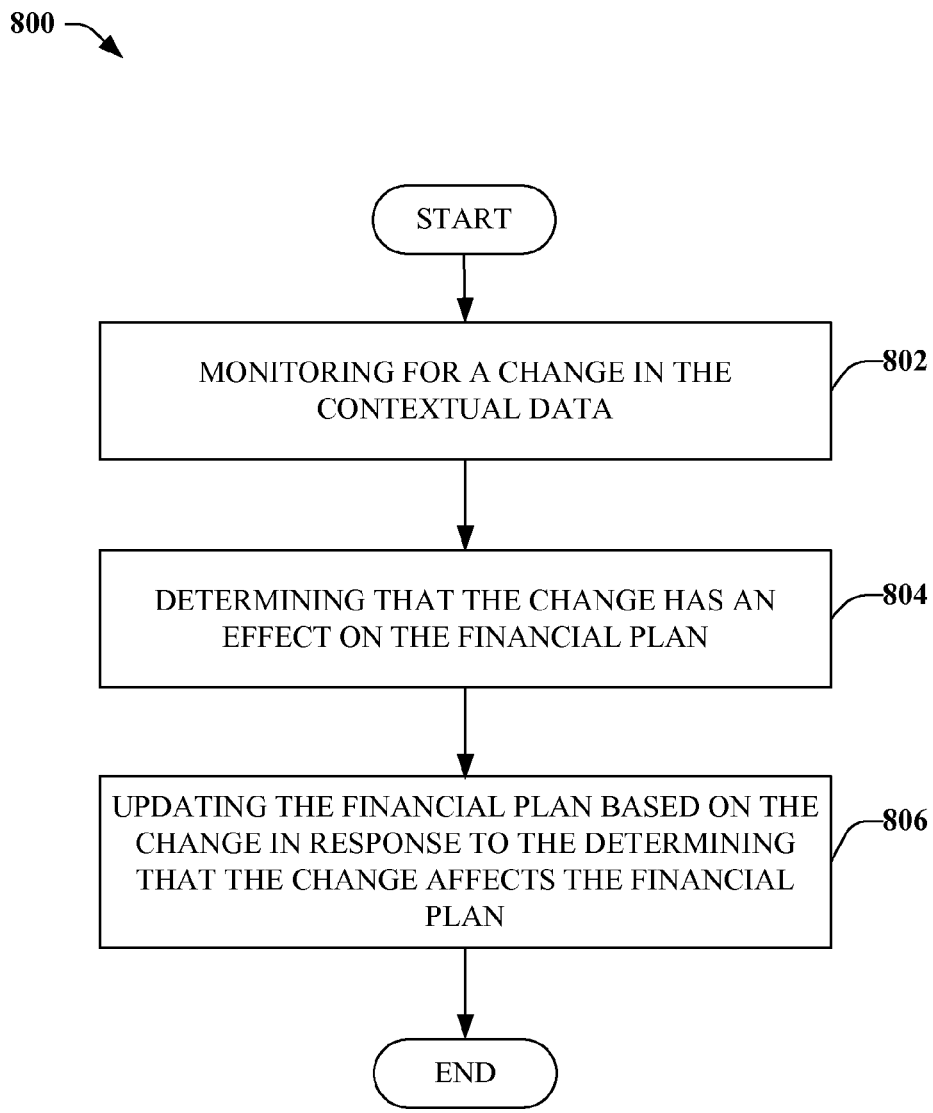
FIG. 8 illustrates a flow diagram of an example, non-limiting embodiment of a method for monitoring and updating a financial plan based on changing contextual data.

In view of the example systems described above, methods that may be implemented in accordance with the described subject matter may be better appreciated with reference to the flow charts of FIGS. 7 and 8. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 7, illustrated is an example methodology 700 for financial planning in accordance with aspects described herein. Methodology 700 can begin at block 702, wherein data that provides a contextual background for a user identity is gathered (e.g., by search component 302). The data that provides a contextual background can be obtained, located or acquired using identifiers associated with the user identity. For example, the identifiers can include but are not limited to name of the user, date of birth, email address, home address, phone number, and so forth. The contextual data can be acquired by searching a set of data sources that include, but are not limited to financial institutions, social networks, and loyalty programs. Other data sources include virtually any open source or publicly available sources of information, including but not limited to websites, search engine results, social networking websites, online resume databases, job boards, government records, online groups, payment processing services, online subscriptions, and so forth. In addition, the data sources can include private databases, such as credit reports, loan applications, and so forth.

From the financial institutions, contextual data can include not just account balance information from bank accounts, credit accounts, investment accounts and other accounts. Instead, detailed transaction histories, historical trend information, information about linked accounts, and so on can be searched and collected as well. Contextual background information from social networks can be collected as well. Activity on social networks such as "check-ins", "likes" and so forth can be collected to show the users preferences and interests.

At 704, a portion of the contextual background that is determined to be commercially relevant to a financial goal can be identified (e.g., by analysis component 304). In some embodiments the user profile can be arranged chronologically, and in others it can be arranged relationally. A relationally organized user profile can apply tags to bits of the contextual data wherein the tags indicate a shared relationship. For instance, contextual data providing information about purchases made by the user can share a tag or identifier. Subsets of that purchase information—such as data about luxury item purchases, or expenses for utilities can share a sub-tag indicating another layer of relationships. It can be determined whether contextual background information is relevant based on an analysis of the contextual data tags. For instance, if the financial goal is related to a purchase of a luxury good, contextual data related to other purchases of a luxury good, among other items, can be considered relevant. If the financial goal is related to an investment goal, contextual data providing information about finances, cash flow, risk level, and so forth can be considered relevant.

At 706, a financial plan to achieve the financial goal is created (e.g., by planning component 306), wherein the plan is based at least in part on the portion of the contextual background that is determined to be commercially relevant. The financial plan can include contribution amounts, contribution times, and so on to achieve the financial goal. For instance, if a savings goal is to save $10,000, a plan can be created where the user contributes $1,000 every month for 10 months. If the relevant contextual data shows that the user cannot afford to save $1,000 every month, the financial plan can be adjusted to match the contribution abilities of the user.

Referring now to FIG. 8, illustrated is an example method 800 for monitoring and updating a financial plan based on changing contextual data. Method 800 can begin at block 802 where a change in contextual data is monitored for (e.g., by monitoring component 402). Changes can be monitored by checking for changes periodically at predefined intervals. In other embodiments, the monitoring can be passive, where data sources provide notifications when changes have been made. Notifications can be push notifications in some embodiments and via RSS feeds in others.

When changes are periodic, searches with the identifiers can be performed again. Results obtained with the periodic searches can be compared against the results obtained from the initial search, or from the prior search. Any changes can be identified easily in this manner.

At 804, it can be determined whether the change has an effect on the financial plan. If the changes are relevant, the financial plan can be updated based on the changes at 806 (e.g., by update component 404).

Example Computing Environment

Figure 9:
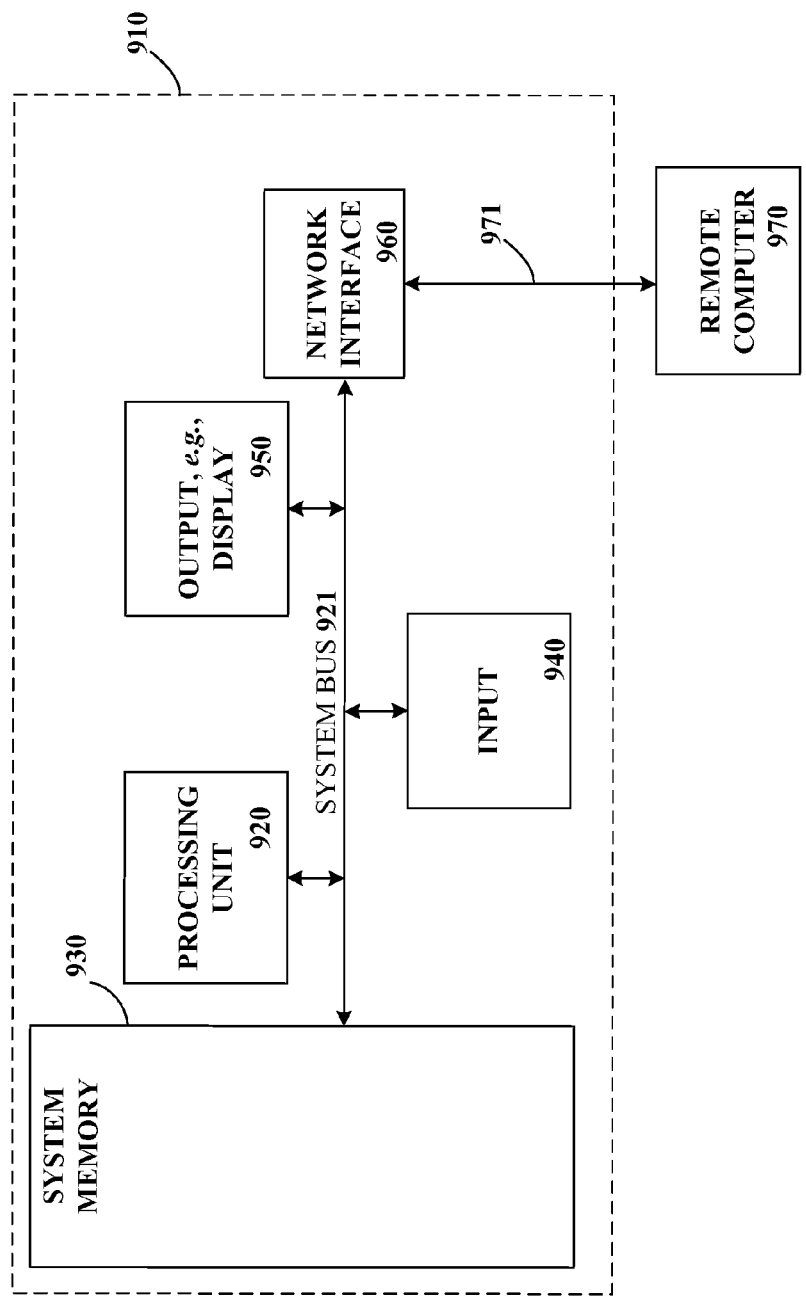
FIG. 9 illustrates a block diagram of an example electronic computing environment that can be implemented in conjunction with one or more aspects described herein.

As mentioned, advantageously, the techniques described herein can be applied to any device where it is desirable to facilitate shared shopping. It is to be understood, therefore, that handheld, portable and other computing devices and computing objects of all kinds are contemplated for use in connection with the various non-limiting embodiments, i.e., anywhere that a device may wish to engage in a shopping experience on behalf of a user or set of users. Accordingly, the below general purpose remote computer described below in FIG. 9 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 9 thus illustrates an example of a suitable computing system environment 900 in which some aspects of the disclosed subject matter can be implemented, although as made clear above, the computing system environment 900 is only one example of a suitable computing environment for a device and is not intended to suggest any limitation as to the scope of use or functionality of the disclosed subject matter. Neither should the computing environment 900 be interpreted as having any dependency or requirement relating to any one or combination of components illustrated in the exemplary operating environment 900.

With reference to FIG. 9, an exemplary device for implementing the disclosed subject matter includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures.

Computer 910 typically includes a variety of computer readable media. Computer readable media can be any available media that can be accessed by computer 910. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules, or other data in a modulated data signal such as a carrier wave or other transport mechanism and includes any information delivery media.

The system memory 930 may include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, may be stored in memory 930. Memory 930 typically also contains data and/or program modules that are immediately accessible to and/or presently being operated on by processing unit 920. By way of example, and not limitation, memory 930 may also include an operating system, application programs, other program modules, and program data.

The computer 910 may also include other removable/non-removable, volatile/nonvolatile computer storage media. For example, computer 910 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 921 through a non-removable memory interface such as an interface, and a magnetic disk drive or optical disk drive is typically connected to the system bus 921 by a removable memory interface, such as an interface.

A user can enter commands and information into the computer 910 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 920 through user input 940 and associated interface(s) that are coupled to the system bus 921, but may be connected by other interface and bus structures, such as a parallel port, game port, or a universal serial bus (USB). A graphics subsystem can also be connected to the system bus 921. A projection unit in a projection display device, or a HUD in a viewing device or other type of display device can also be connected to the system bus 921 via an interface, such as output interface 950, which may in turn communicate with video memory. In addition to a monitor, computers can also include other peripheral output devices such as speakers which can be connected through output interface 950.

The computer 910 can operate in a networked or distributed environment using logical connections to one or more other remote computer(s), such as remote computer 970, which can in turn have media capabilities different from device 910. The remote computer 970 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 910. The logical connections depicted in FIG. 9 include a network 971, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 910 can be connected to the LAN 971 through a network interface or adapter. When used in a WAN networking environment, the computer 910 can typically include a communications component, such as a modem, or other means for establishing communications over the WAN, such as the Internet. A communications component, such as wireless communications component, a modem and so on, which can be internal or external, can be connected to the system bus 921 via the user input interface of input 940, or other appropriate mechanism. In a networked environment, program modules depicted relative to the computer 910, or portions thereof, can be stored in a remote memory storage device. It will be appreciated that the network connections shown and described are exemplary and other means of establishing a communications link between the computers can be used.

Example Networking Environment

Figure 10:
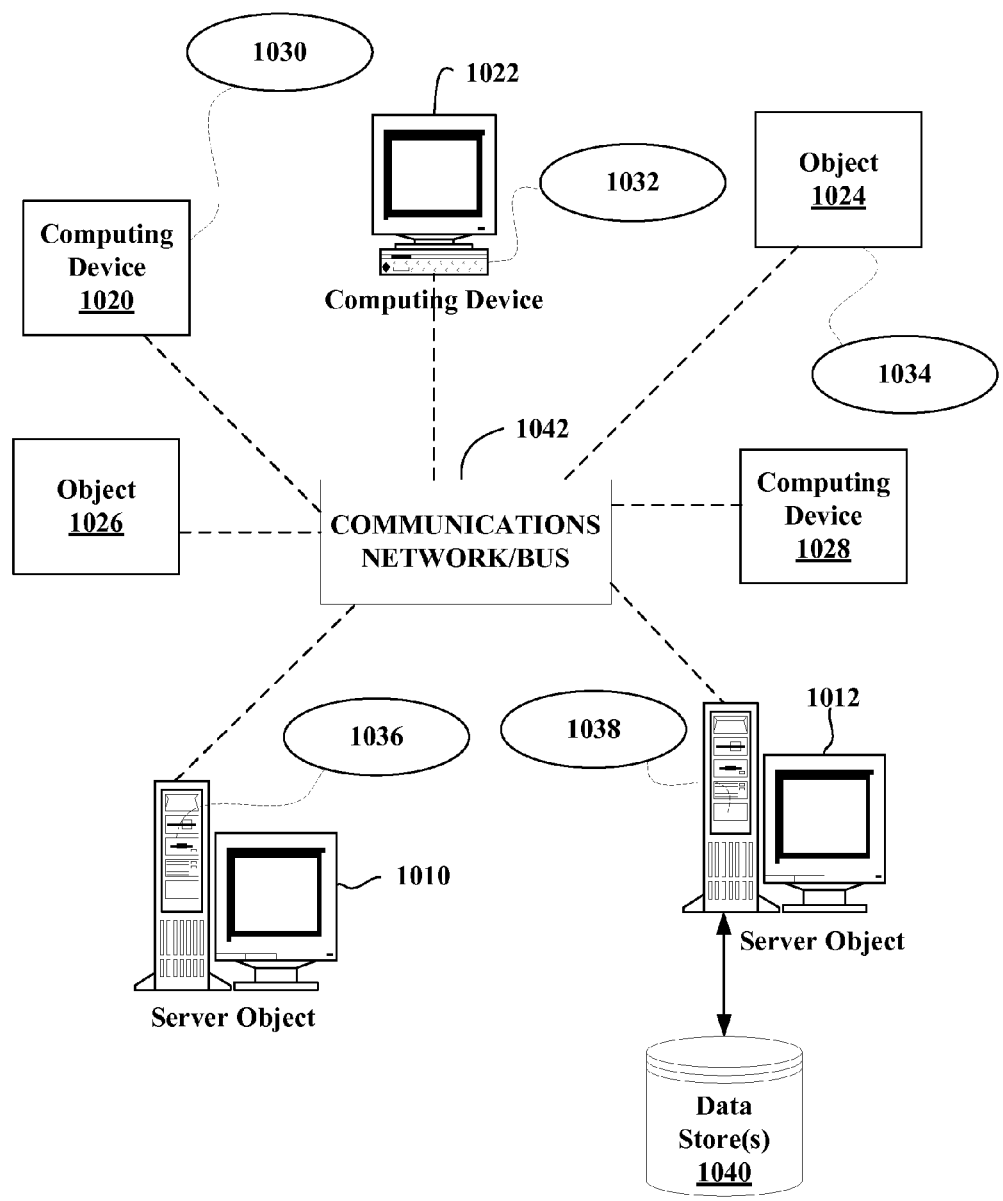
FIG. 10 illustrates a block diagram of an example data communication network that can be operable in conjunction with various aspects described herein.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038 and data store(s) 1040. It can be appreciated that computing objects 1010, 1012, etc. and computing objects or devices 1020, 1022, 1024, 1026, 1028, etc. may comprise different devices, including multimedia display device 100 or similar devices depicted within the illustrations, or other devices such as a mobile phone, personal digital assistant (PDA), audio/video device, MP3 players, personal computer, laptop, etc. It should be further appreciated that data store(s) 1040 can include data store 108, or other similar data stores disclosed herein.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, and/or may represent multiple interconnected networks, which are not shown. Each computing object 1010, 1012, etc. or computing object or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "module", "interface," "user interface", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers. Further, these components can execute from various non-transitory computer-readable media having various data structures stored thereon. In this regard, the terms "non-transitory" and "tangible" herein as applied to storage, memory or computer-readable media, is to be understood to exclude only propagating transitory signals per se as a modifier and does not relinquish all standard storage, memory or computer-readable media that are not only propagating transitory signals per se.

The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The subject matter described herein can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The word "exemplary" where used herein means serving as an example, instance, or illustration. For the avoidance of doubt, the subject matter disclosed herein is not limited by such examples. In addition, any aspect or design described herein as "exemplary," "demonstrative," or the like, is not necessarily to be construed as preferred or advantageous over other aspects or designs, nor is it meant to preclude equivalent exemplary structures and techniques known to those of ordinary skill in the art.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system, comprising:
   a memory storing executable instructions; and
   a processor, communicatively coupled to the memory, which executes, or facilitates execution of, one or more of the executable instructions to at least:
   search for contextual data related to a user identity;
   organize the contextual data returned from search into profile data representing a user profile for the user identity;
   classify the contextual data of the profile data using a set of metadata tags;
   determine a relevancy of the contextual data to a financial goal associated with a plurality of user identities that associated with a plurality of users, including the user identity, wherein the financial goal is represented by financial data associated with the user identity based on a function of a relationship of the metadata tags to the financial goal; and
   generate plan data representing a collaborative financial plan to achieve the financial goal for the plurality of user identities, wherein the collaborative financial plan is based at least in part on relevant contextual data determined from the profile data representing the user profile and at least in part on respective relative contributions for the plurality of user identities determined based at least in part on a financial interest in the financial goal.

2. The system of claim 1, wherein the contextual data includes data representing a financial status of the user identity.

3. The system of claim 1, wherein the processor further executes or facilitates the execution of the executable instructions to:
   monitor for a modification in the contextual data; and
   update the plan data representing the collaborative financial plan based on the modification of the contextual data.

4. The system of claim 3, wherein the processor further executes or facilitates the execution of the executable instructions to send a notification to contact information associated with the user identity in response to the modification of the contextual data.

5. The system of claim 1, wherein the processor further executes or facilitates the execution of the executable instructions to receive an alert from a financial institution associated with the user identity.

6. The system of claim 5, wherein the alert comprises a short message service message or an email message.

7. The system of claim 5, wherein the alert includes information about a transaction history over a period of time.

8. The system of claim 1, wherein the processor further executes or facilitates the execution of the executable instructions to receive login information associated with the user identity.

9. The system of claim 8, wherein the processor further executes or facilitates the execution of the executable instructions to access financial institution user account data associated with the user identity based on the login information.

10. The system of claim 1, wherein the processor further executes or facilitates the execution of the executable instructions to collect at least some of the contextual data from social networking account data associated with the user identity.

11. The system of claim 1, wherein the processor further executes or facilitates the execution of the executable instructions to optimize an expense based at least in part on transaction data representing a transaction history of the user identity and the contextual data.

12. The system of claim 1, wherein the financial interest in the financial goal is based on a financial benefit received in response to completion of the financial goal.

13. A tangible computer-readable storage device comprising executable instructions that, in response to execution, cause a system including a processor to perform operations, comprising:
   collecting contextual data related to a user identity;
   generating profile data representing a user profile for a user identity based on the contextual data;
   classifying the contextual data of the profile data using a set of metadata tags;
   identifying a portion of the user profile that is relevant to a financial goal associated with a plurality of user identities that are associated with a plurality of users, including the user identity, wherein the financial goal is represented by financial data associated with the user identity, based on a function of a relationship of the metadata tags to the financial goal; and
   generating plan data representing a collaborative financial plan to achieve the financial goal for the plurality of user identities, wherein the collaborative financial plan is based on the portion of the profile data of the user profile determined to be relevant to the financial goal and on respective relative contributions for the plurality of user identities determined based on a financial interest in the financial goal.

14. The tangible computer-readable storage device of claim 13, the operations further comprising:
   monitoring for a change in the contextual data; and
   updating the plan data representing the collaborative financial plan based on the change in the contextual data in response to determining that the change in the contextual data has an effect on the plan data representing the collaborative financial plan.

15. The tangible computer-readable storage device of claim 14, wherein the operations further comprise:
   transmitting an alert to a mobile device or an email account associated with the user identity in response to the change being determined to be present in the contextual data.

16. A method, comprising:
   searching, by a system comprising at least one processing device, for contextual data related to a user identity;
   organizing, by the system, the contextual data returned from the searching into profile data representing a user profile for the user identity and classifying the contextual data of the profile data using a set of metadata tags;

determining, by the system, a relevancy of the contextual data to a financial goal associated with user identities that are associated with users, including the user identity, wherein the financial goal is represented by financial data associated with the user identity based on a function of a relationship of the metadata tags to the financial goal; and generating, by the system, a plan data representing a collaborative financial plan to achieve the financial goal for the user identities, wherein the collaborative financial plan is based at least on relevant contextual data determined from the profile data representing the user profile, and on a relative contributions respectively for the user identities determined based at least on a financial interest in the financial goal.

17. The method of claim 16, further comprising:

monitoring, by the system, for a change in the contextual data;

determining, by the system, that the change affects the plan data representing the collaborative financial plan; and updating, by the system, the plan data representing the collaborative financial plan in response to the change in contextual data being determined to affect the plan data.

18. The method of claim 17, further comprising transmitting, by the system, an alert to a mobile device or an email account associated with the user identity in response to the change being determined to be present in the contextual data.

19. The method of claim 16, further comprising subscribing, by the system, to notifications from a data service of a financial institution using authentication information associated with the user identity, wherein the notifications include transaction information relating to transaction data representing a transaction history of an account associated with the user identity.

20. The method of claim 16, wherein the searching for contextual data includes searching social networking account information of a social networking service associated with the user identity.

* * * * *